(12) United States Patent
Aksu et al.

(10) Patent No.: US 12,149,800 B2
(45) Date of Patent: Nov. 19, 2024

(54) METHOD AND APPARATUS FOR STORING AND SIGNALING PREDICTIVELY CODED IMAGE ITEMS

(71) Applicant: Nokia Technologies Oy, Espoo (FI)

(72) Inventors: Emre Aksu, Tampere (FI); Miska Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/045,686

(22) PCT Filed: Apr. 10, 2019

(86) PCT No.: PCT/FI2019/050289
§ 371 (c)(1),
(2) Date: Oct. 6, 2020

(87) PCT Pub. No.: WO2019/197724
PCT Pub. Date: Oct. 17, 2019

(65) Prior Publication Data
US 2021/0029422 A1    Jan. 28, 2021

Related U.S. Application Data

(60) Provisional application No. 62/656,148, filed on Apr. 11, 2018.

(51) Int. Cl.
*H04N 21/854* (2011.01)
*H04N 19/597* (2014.01)
(Continued)

(52) U.S. Cl.
CPC ..... *H04N 21/85406* (2013.01); *H04N 19/597* (2014.11); *H04N 19/70* (2014.11); *H04N 21/8456* (2013.01)

(58) Field of Classification Search
CPC ........ H04N 21/85406; H04N 21/8456; H04N 19/597; H04N 19/70
See application file for complete search history.

(56) References Cited

U.S. PATENT DOCUMENTS

2011/0032980 A1* 2/2011 Gao ............... H04N 19/132
                                                    375/240.01
2011/0080959 A1* 4/2011 Bjorklund ........... H04N 19/61
                                                    348/E5.062

(Continued)

OTHER PUBLICATIONS

"Information Technology—High Efficiency Coding and Media Delivery in Heterogeneous Environments—Part 12 : Image File Format", ISO/IEC 23008-12, First Edition, Dec. 2017, 82 pages.

(Continued)

*Primary Examiner* — Jefferey F Harold
*Assistant Examiner* — Franklin S Andramuno
(74) *Attorney, Agent, or Firm* — Joseph C. Drish; McCarter & English LLP

(57) ABSTRACT

A method, apparatus and computer program product are provided to include information within a container that also includes a video bitstream as to whether individual image items corresponding to the video frames of the video bitstream bitstreams are self-decodable or, alternatively, are dependent upon one or more other image items. In an instance in which a respective image item is dependent upon one or more other image items, the method, apparatus and computer program product also include dependence information within the container identifying the other image item(s) upon which the decodability of the respective image item is dependent. As such, the method, apparatus and computer program product permit decoding relationships to be defined in the container between a predictively coded frame and other image item(s) upon which the predictively (Continued)

coded frame is dependent, thereby facilitating the decoding of the frame and, in turn, the video bitstream.

17 Claims, 7 Drawing Sheets

(51) Int. Cl.
    *H04N 19/70*     (2014.01)
    *H04N 21/845*     (2011.01)

(56) References Cited

U.S. PATENT DOCUMENTS

| | | | |
|---|---|---|---|
| 2012/0221741 A1* | 8/2012 | Frojdh | G11B 20/14 |
| | | | 348/E7.024 |
| 2020/0288122 A1* | 9/2020 | Kim | H04N 19/70 |
| 2021/0109970 A1* | 4/2021 | Ouedraogo | G06F 16/908 |

OTHER PUBLICATIONS

"Defect Report and Technology under Consideration on ISO/IEC 23008-12", ISO/IEC JTC1/SC29/WG11 MPEG2018/N17421, Systems, Jan. 2018, 3 pages.

"Information technology—Coding of Audiovisual Objects—Part 12: ISO base media file format", ISO/IEC 14496-12, Fifth Edition, Feb. 20, 2015, 254 pages.

International Search Report and Written Opinion received for corresponding Patent Cooperation Treaty Application No. PCT/FI2019/050289, dated Sep. 24, 2019, 14 pages.

Hannuksela et al., "The High Efficiency Image File Format Standard", [Standards in a Nutshell], IEEE Signal Processing Magazine, vol. 32, No. 4, Jul. 2015, pp. 150-156.

Ohm et al., "High Efficiency Video Coding: The Next Frontier in Video Compression", [Standards in a Nutshell], IEEE Signal Processing Magazine, vol. 30, No. 1, Jan. 2013, pp. 152-158.

"ISO/IEC 23008-12 Information technology—High efficiency coding and media delivery in heterogeneous environments Part 12: Image File Format", ISO/IEC Standard, ISO/IEC, CH, Nov. 30, 2017, 82 pages.

"High Efficiency Image File Format: Technical Overview and Examples", ISO/IEC JTC1/SC29/WG11 MPEG2015/N15695, Oct. 2015, 23 pages.

"[HEIF] On predictively ended image items", ISO/IEC JTC1/SC29/WG11 MPEG2018/M42577, Apr. 2018, 4 pages.

\* cited by examiner

METHOD AND APPARATUS FOR STORING AND SIGNALING PREDICTIVELY CODED IMAGE ITEMS

RELATED APPLICATION

This application claims priority to PCT Application No. PCT/FI2019/050289, filed on Apr. 10, 2019, which claims priority to U.S. Provisional Application No. 62/656,148, filed on Apr. 11, 2018, each of which is incorporated herein by reference in its entirety.

TECHNOLOGICAL FIELD

An example embodiment relates generally to the signaling of predictively coded image items and, more particularly, to signaling predictively coded image items in a container, such as an image container file.

BACKGROUND

Image files are frequently created, stored, transmitted and/or rendered for a variety of purposes including video presentation, virtual reality applications or the like. In order to facilitate the use of image files, standards have been developed in order to regulate the construction of image files, thereby facilitating the uniform construction and subsequent processing of such image files.

In this regard, the International Standards Organization (ISO) Base Media File Format (ISOBMFF) defines a general structure for time-based multimedia files including video and audio files. ISOBMFF defines the timing, structure and media information for time sequences of media data. Files conforming to the ISOBMFF include a series of objects, termed boxes. Building on top of ISOBMFF, a High Efficiency Image File Format (HEIF) standard has been developed by the Moving Picture Experts Group (MPEG) for the storage of images and image sequences. HEIF includes a rich set of features that can be utilized for a wide variety of use cases.

Video encoders, such as an advanced video coding (AVC) encoder or a high efficiency video coding (HEVC) encoder, can encode a video frame in a self-sufficient manner such that the decoding of the video frame has no dependency on any other frame. Such a frame is termed an "intra" encoded frame and may be indicated by the designation "I". Video encoders can also encode a video frame such that the video frame can be fully or partially predicted from one or more other video frames. Such frames are called either predicted frames in an instance in which a frame is predicted from a single video frame and is denoted by the designation "P" or a bidirectionally—predicted frame in an instance in which the video frame is predicted from two other video frames and is denoted by the designation "B". Usage of P and B frames reduces the size of the video bitstream.

In an HEIF file, both image items and video bitstreams can be stored. Video bitstreams are stored as video tracks or as image sequence tracks. The video bitstream of such tracks is generally stored in the HEIF file in "decoding" order, such as within a media data box (mdat) of the HEIF file. In order to resolve decoding dependencies within a video bitstream in an HEIF file, an extended visual sample group entry termed a DirectReferenceSampleList( ) in the HEIF file format specification is defined for the image sequence track. This data structure can be used to create a decoding dependency map of an image sequence sample so that a non-intra-frame can be correctly decoded when the non-intra-frame is randomly accessed.

Within an image container of an HEIF file, one of the image items may be selected as a primary image item. The primary image item is the main representation of the image container file and may, for example, serve as the cover image as is shown within a file explorer window. Among other types of images, an image container file may store and permit access to burst images which are generated by the capture of very frequent images in a sequential manner, such as by an image capture device operating in a burst mode. Burst images may be stored either as individual image items are as an image sequence track to reduce the storage size. One of the burst images may be selected as a primary image item.

The HEIF file format specification requires that a primary image item must be self—decodable. Hence, a P or B frame in an image sequence track cannot be selected as a primary item, unless a transcoding operation is performed and an intra-encoded version of the same frame is stored in association with the original video bitstream. This transcoding operation disadvantageously consumes additional processing resources and results in an increase in the file size.

BRIEF SUMMARY

A method, apparatus and computer program product are provided in accordance with an example embodiment in order to provide information within a container that includes a video bitstream as to whether individual image items corresponding to the video frames of the video bitstreams are self-decodable without reference to other image items or, alternatively, are dependent upon one or more other image items. In an instance in which a respective image item is dependent upon one or more other image items, the method, apparatus and computer program product of an example embodiment also include dependence information within the container identifying the one or more other image items upon which the decodability of the respective image item is dependent. As such, the method, apparatus and computer program product of an example embodiment facilitate the decoding of predictively coded frames of a video bitstream, the decoding of which is dependent upon other video frames, such as P or B frames. The method, apparatus and computer program product of an example embodiment permit decoding relationships to be defined in the container between a predictively coded frame and one or more other image items upon which the predictively coded frame is dependent, thereby facilitating the decoding of the frame and, in turn, the video bitstream. Additionally, the method, apparatus and computer program product facilitate the selection of a predictively coded image item as a primary image item as a result of the inclusion of information regarding whether a respective image item is self-decodable or is dependent upon one or more other image items and, in an instance in which the respective image item is dependent upon one or more other image items, the additional inclusion of dependence information that identifies the one or more other image items upon which the respective image item is dependent. As such, transcoding operations may be avoided and at least some of the file size increase created in an instance in which a P or B frame of an image sequence track is selected as the primary image item may be averted.

In an example embodiment, a method is provided that comprises constructing a container including a video bitstream comprised of a plurality of video frames having corresponding image items. The method also comprises defining, within the container, a descriptive item property for a respective image item. The descriptive item property includes a decodability indicator providing information as to whether the respective image item is self-decodable without reference to other image items or is dependent upon one or more other image items. In an instance in which the decodability indicator of the descriptive item property indicates that the respective image item is dependent upon one or more other image items, the method further comprises including dependence information within the container that identifies the one or more other image items upon which decodability of the respective image item is dependent.

The method of an example embodiment includes the dependence indicator by including the dependence information within the descriptive item property for the respective image item. The dependence information of this example embodiment comprises a list of the one or more other image items upon which decoding of the respective image item is dependent. The method of another example embodiment includes the dependence information by defining an item property box within the container for the respective image item. The item property box of this example embodiment includes the dependence information, and the dependence information comprises a list of one or more other image items upon which decoding of the respective image item is dependent. The method of a further example embodiment includes the dependence information by concatenating the video frames of the respective image item and the one or more other image items upon which decoding of the respective image item is dependent.

In another example embodiment, an apparatus is provided that comprises at least one processor and at least one memory including computer program code for one or more programs with the at least one memory and the computer program code configured to, with the at least one processor, cause the apparatus at least to construct a container including a video bitstream comprised of a plurality of video frames having corresponding image items. The at least one memory and the computer program code are also configured to, with the at least one processor, cause the apparatus to define, within the container, a descriptive item property for a respective image item. The descriptive item property includes a decodability indicator providing information as to whether the respective image item is self-decodable without reference to other image items or is dependent upon one or more other image items. In an instance in which the decodability indicator of the descriptive item property indicates that the respective image item is dependent upon one or more other image items, the at least one memory and the computer program code are further configured to, with the at least one processor, cause the apparatus to include dependence information within the container that identifies the one or more other image items upon which decodability of the respective image item is dependent.

The at least one memory and the computer program code are configured to, with the at least one processor, cause the apparatus of an example embodiment to include the dependence indicator by including the dependence information within the descriptive item property for the respective image item. The dependence information of this example embodiment comprises a list of the one or more other image items upon which decoding of the respective image item is dependent. The at least one memory and the computer program code are configured to, with the at least one processor, cause the apparatus of another example embodiment to include the dependence information by defining an item property box within the container for the respective image item. The item property box of this example embodiment includes the dependence information, and the dependence information comprises a list of one or more other image items upon which decoding of the respective image item is dependent. The at least one memory and the computer program code are configured to, with the at least one processor, cause the apparatus of a further example embodiment to include the dependence information by concatenating the video frames of the respective image item and the one or more other image items upon which decoding of the respective image item is dependent.

In a further example embodiment, a computer program product is provided that comprises at least one non-transitory computer-readable storage medium having computer executable program code instructions stored therein with the computer executable program code instructions comprising program code instructions configured, upon execution, to construct a container including a video bitstream comprised of a plurality of video frames having corresponding image items. The computer executable program code instructions also comprise program code instructions configured, upon execution, to definie, within the container, a descriptive item property for a respective image item. The descriptive item property includes a decodability indicator providing information as to whether the respective image item is self-decodable without reference to other image items or is dependent upon one or more other image items. In an instance in which the decodability indicator of the descriptive item property indicates that the respective image item is dependent upon one or more other image items, the computer executable program code instructions further comprise program code instructions configured, upon execution, to include dependence information within the container that identifies the one or more other image items upon which decodability of the respective image item is dependent.

In an example embodiment, the program code instructions configured to include the dependence indicator comprise program code instructions configured to include the dependence information within the descriptive item property for the respective image item. The dependence information of this example embodiment comprises a list of the one or more other image items upon which decoding of the respective image item is dependent. In another example embodiment, the program code instructions configured to include the dependence indicator comprise program code instructions configured to define an item property box within the container for the respective image item. The item property box of this example embodiment includes the dependence information, and the dependence information comprises a list of one or more other image items upon which decoding of the respective image item is dependent. In a further example embodiment, the program code instructions configured to include the dependence indicator comprise program code instructions configured to concatenate the video frames of the respective image item and the one or more other image items upon which decoding of the respective image item is dependent.

In yet another example embodiment, an apparatus is provided that comprises means for constructing a container including a video bitstream comprised of a plurality of video frames having corresponding image items. The apparatus also comprises means for defining, within the container, a descriptive item property for a respective image item. The descriptive item property includes a decodability indicator providing information as to whether the respective image item is self-decodable without reference to other image items or is dependent upon one or more other image items. In an instance in which the decodability indicator of the descriptive item property indicates that the respective image item is dependent upon one or more other image items, the apparatus further comprises means for including dependence information within the container that identifies the one or more other image items upon which decodability of the respective image item is dependent.

In an example embodiment, the means for including the dependence indicator comprises means for including the dependence information within the descriptive item property for the respective image item. The dependence information of this example embodiment comprises a list of the one or more other image items upon which decoding of the respective image item is dependent. In another example embodiment, the means for including the dependence information comprises means for defining an item property box within the container for the respective image item. The item property box of this example embodiment includes the dependence information, and the dependence information comprises a list of one or more other image items upon which decoding of the respective image item is dependent. In a further example embodiment, the means for including the dependence information comprises means for concatenating the video frames of the respective image item and the one or more other image items upon which decoding of the respective image item is dependent.

In an example embodiment, a method is provided that comprises receiving a container including a video bitstream comprised of a plurality of video frames having corresponding image items. The method also comprises identifying, within the container, a descriptive item property for a respective image item. The descriptive item property includes a decodability indicator providing information as to whether the respective image item is self-decodable without reference to other image items or is dependent upon one or more other image items. In an instance in which the decodability indicator of the descriptive item property indicates that the respective image item is dependent upon one or more other image items, the method further comprises identifying dependence information within the container that identifies the one or more other image items upon which decodability of the respective image item is dependent. The method additionally comprises causing the respective image item to be rendered in accordance with the decodability indicator and any dependence information.

The method of an example embodiment identifies the dependence information by identifying the dependence information within the descriptive item property for the respective image item. The dependence information comprises a list of one or more other image items upon which decoding of the respective image item is dependent. The method of another example embodiment identifies the dependence information by identifying an item property box within the container for the respective image item. The item property box includes the dependence information, and the dependence information comprises a list of one or more other image items upon which decoding of the respective image item is dependent. The method of a further example embodiment identifies the dependence information by identifying a concatenation of the video frames corresponding to the respective image item and the one or more other image items upon which decoding of the respective image item is dependent.

In another example embodiment, an apparatus is provided that comprises at least one processor and at least one memory including computer program code for one or more programs with the at least one memory and the computer program code configured to, with the at least one processor, cause the apparatus at least to receive a container including a video bitstream comprised of a plurality of video frames having corresponding image items. The at least one memory and the computer program code are also configured to, with the at least one processor, cause the apparatus to also identify, within the container, a descriptive item property for a respective image item. The descriptive item property includes a decodability indicator providing information as to whether the respective image item is self-decodable without reference to other image items or is dependent upon one or more other image items. In an instance in which the decodability indicator of the descriptive item property indicates that the respective image item is dependent upon one or more other image items, the at least one memory and the computer program code are further configured to, with the at least one processor, cause the apparatus to identify dependence information within the container that identifies the one or more other image items upon which decodability of the respective image item is dependent. The at least one memory and the computer program code are additionally configured to, with the at least one processor, cause the apparatus to cause the respective image item to be rendered in accordance with the decodability indicator and any dependence information.

The at least one memory and the computer program code are configured to, with the at least one processor, cause the apparatus of an example embodiment to identify the dependence information by identifying the dependence information within the descriptive item property for the respective image item. The dependence information comprises a list of one or more other image items upon which decoding of the respective image item is dependent. The at least one memory and the computer program code are configured to, with the at least one processor, cause the apparatus of another example embodiment to identify the dependence information by identifying an item property box within the container for the respective image item. The item property box includes the dependence information, and the dependence information comprises a list of one or more other image items upon which decoding of the respective image item is dependent. The at least one memory and the computer program code are configured to, with the at least one processor, cause the apparatus of a further example embodiment to identify the dependence information by identifying a concatenation of the video frames corresponding to the respective image item and the one or more other image items upon which decoding of the respective image item is dependent.

In a further example embodiment, a computer program product is provided that comprises at least one non-transitory computer-readable storage medium having computer executable program code instructions stored therein with the computer executable program code instructions comprising program code instructions configured, upon execution, to receive a container including a video bitstream comprised of a plurality of video frames having corresponding image items. The computer executable program code instructions also comprise program code instructions configured, upon execution, to identify, within the container, a descriptive item property for a respective image item. The descriptive item property includes a decodability indicator providing information as to whether the respective image item is self-decodable without reference to other image items or is dependent upon one or more other image items. In an instance in which the decodability indicator of the descriptive item property indicates that the respective image item is dependent upon one or more other image items, the computer executable program code instructions further comprise program code instructions configured, upon execution, to identify dependence information within the container that identifies the one or more other image items upon which decodability of the respective image item is dependent. The computer executable program code instructions additionally comprise program code instructions configured, upon execution, to cause the respective image item to be rendered in accordance with the decodability indicator and any dependence information.

In an example embodiment, the program code instructions configured to identify the dependence information comprise program code instructions configured to identify the dependence information within the descriptive item property for the respective image item. The dependence information comprises a list of one or more other image items upon which decoding of the respective image item is dependent. In another example embodiment, the program code instructions configured to identify the dependence information comprise program code instructions configured to identify an item property box within the container for the respective image item. The item property box includes the dependence information, and the dependence information comprises a list of one or more other image items upon which decoding of the respective image item is dependent. In a further example embodiment, the program code instructions configured to identify the dependence information comprise program code instructions configured to identify a concatenation of the video frames corresponding to the respective image item and the one or more other image items upon which decoding of the respective image item is dependent.

In yet another example embodiment, an apparatus is provided that comprises means for receiving a container including a video bitstream comprised of a plurality of video frames having corresponding image items. The apparatus also comprises means for identifying, within the container, a descriptive item property for a respective image item. The descriptive item property includes a decodability indicator providing information as to whether the respective image item is self-decodable without reference to other image items or is dependent upon one or more other image items. In an instance in which the decodability indicator of the descriptive item property indicates that the respective image item is dependent upon one or more other image items, the apparatus further comprises means for identifying dependence information within the container that identifies the one or more other image items upon which decodability of the respective image item is dependent. The apparatus additionally comprises means for causing the respective image item to be rendered in accordance with the decodability indicator and any dependence information.

In an example embodiment, the means for identifying the dependence information comprises means for identifying the dependence information within the descriptive item property for the respective image item. The dependence information comprises a list of one or more other image items upon which decoding of the respective image item is dependent. In another example embodiment, the means for identifying the dependence information comprises means for identifying an item property box within the container for the respective image item. The item property box includes the dependence information, and the dependence information comprises a list of one or more other image items upon which decoding of the respective image item is dependent. In a further example embodiment, the means for identifying the dependence information comprises means for identifying a concatenation of the video frames corresponding to the respective image item and the one or more other image items upon which decoding of the respective image item is dependent.

BRIEF DESCRIPTION OF THE DRAWINGS

Figure 1:
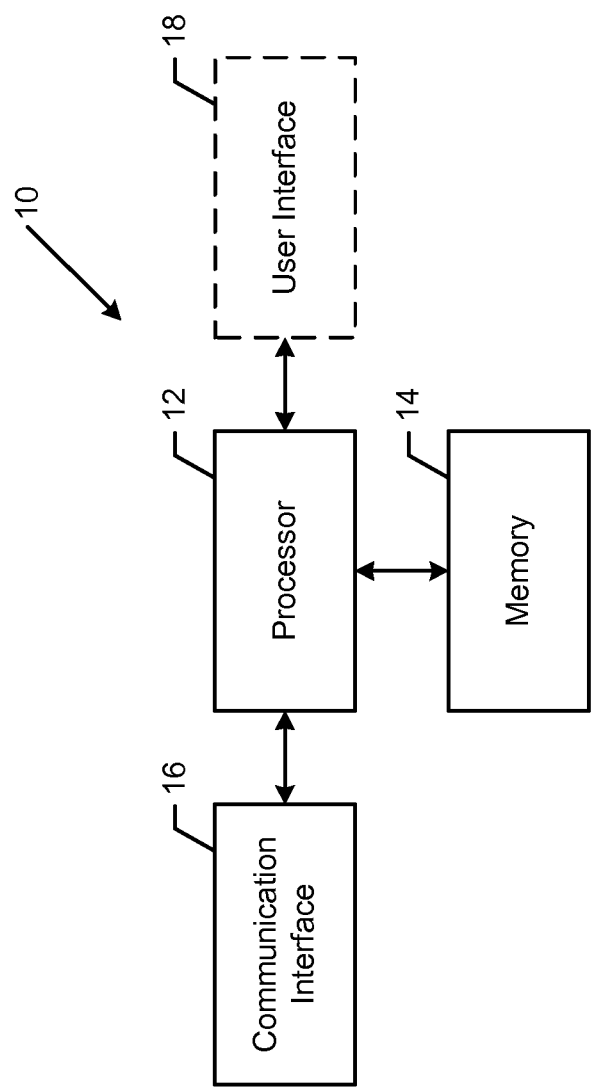
Figure 2:
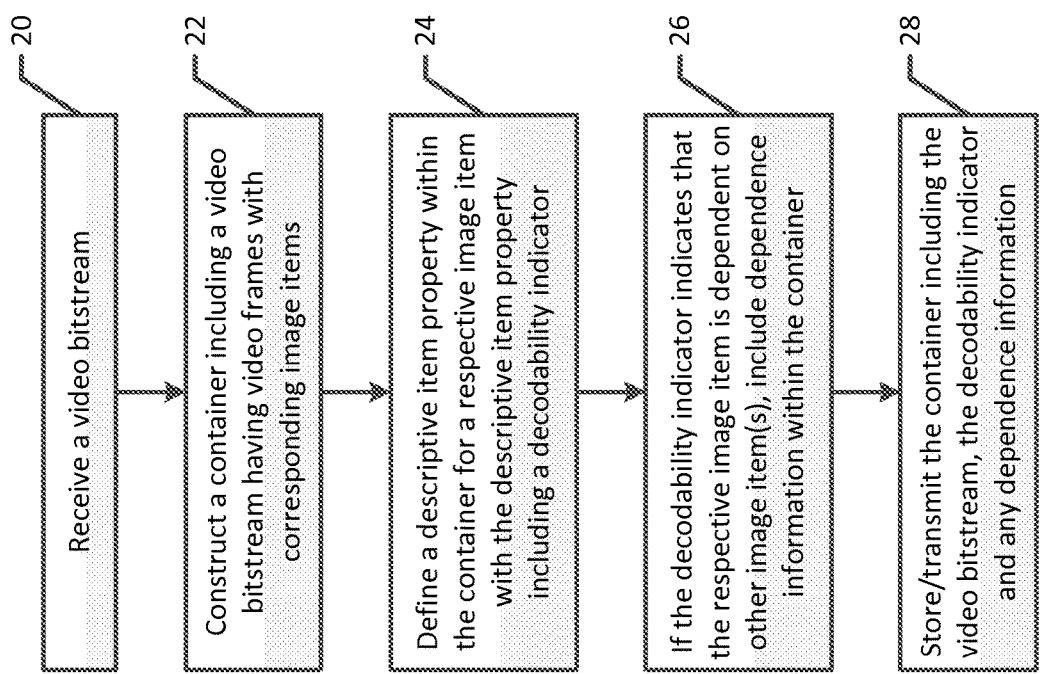
Figure 3:
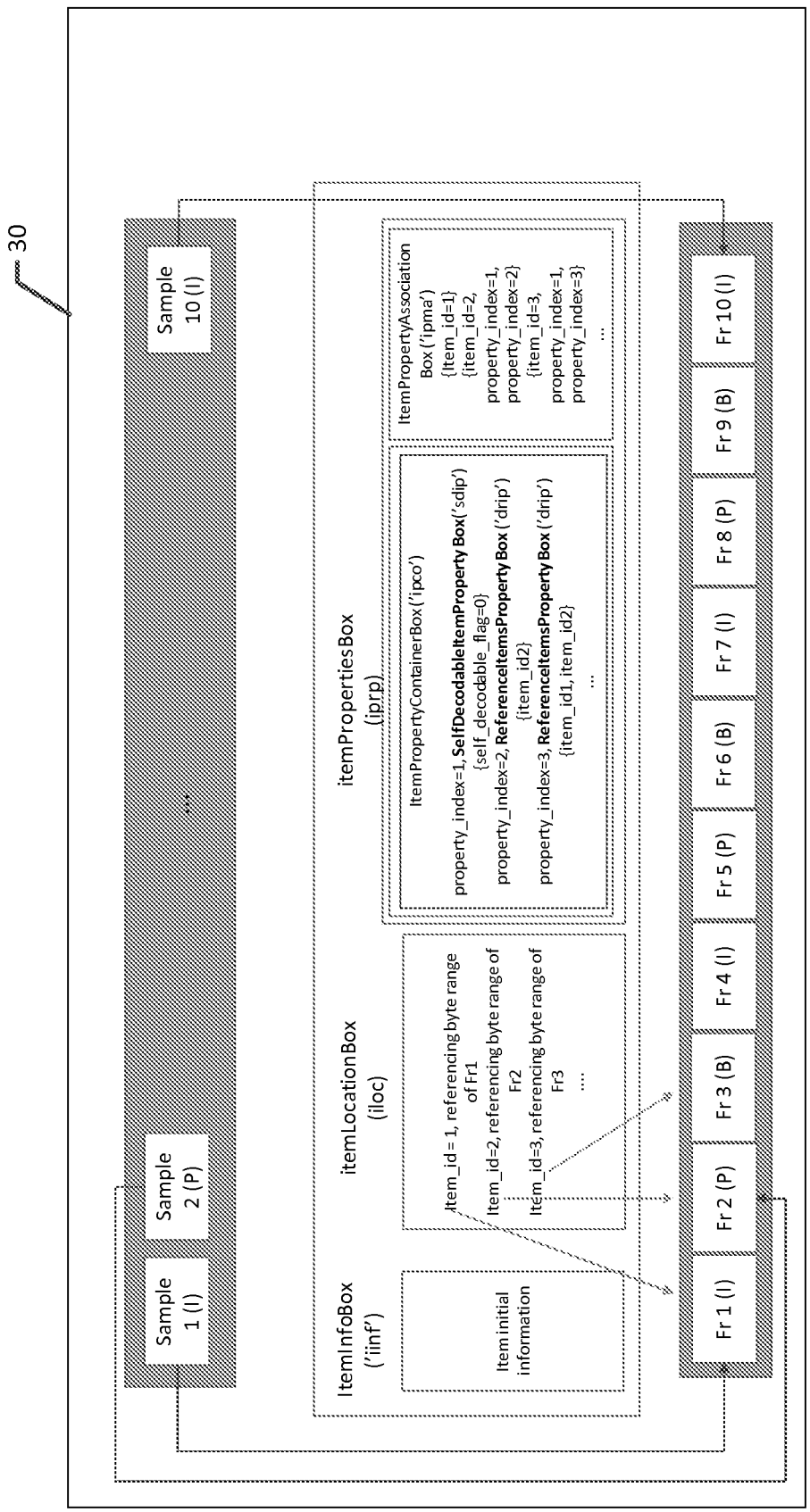
Figure 4:
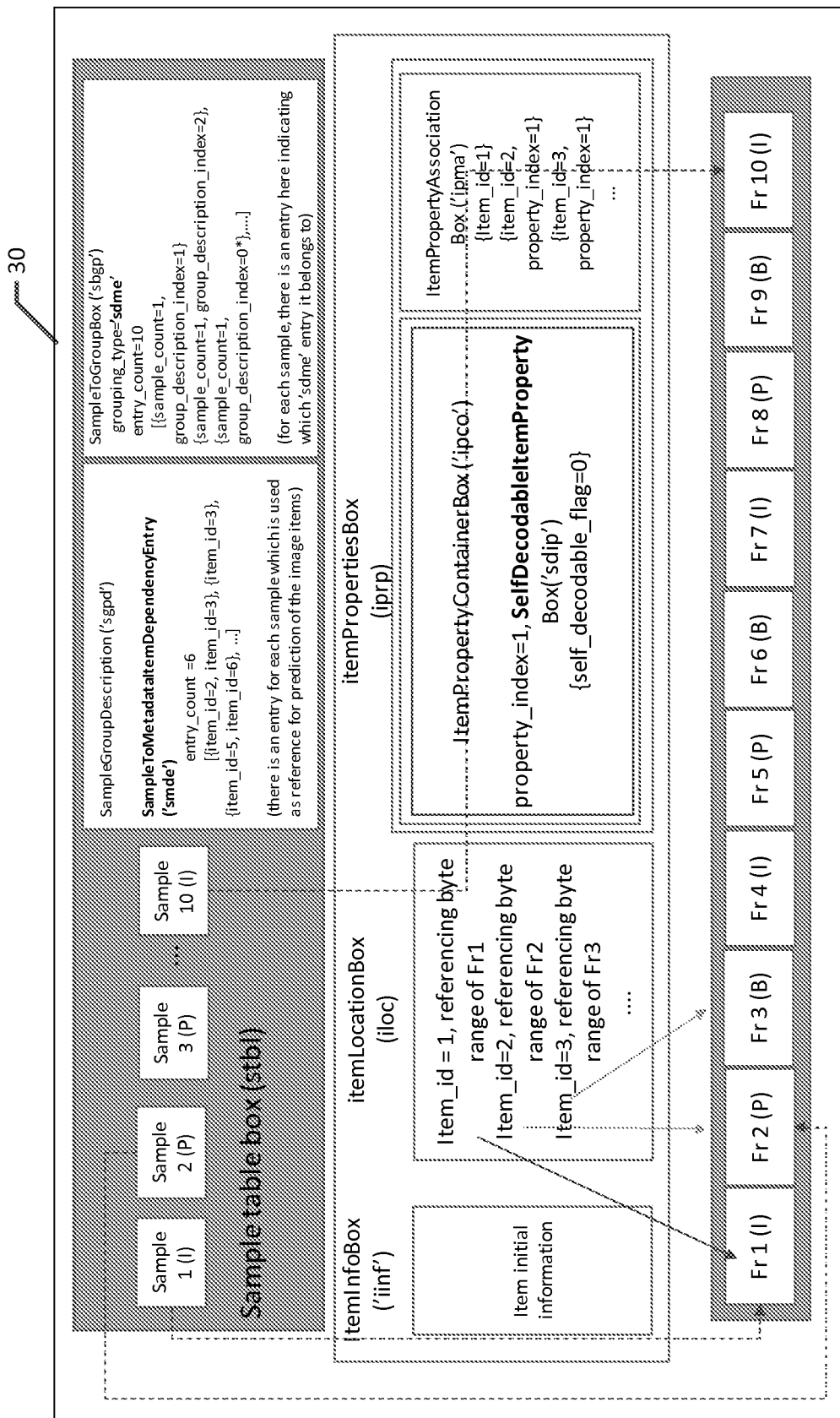
Figure 5:
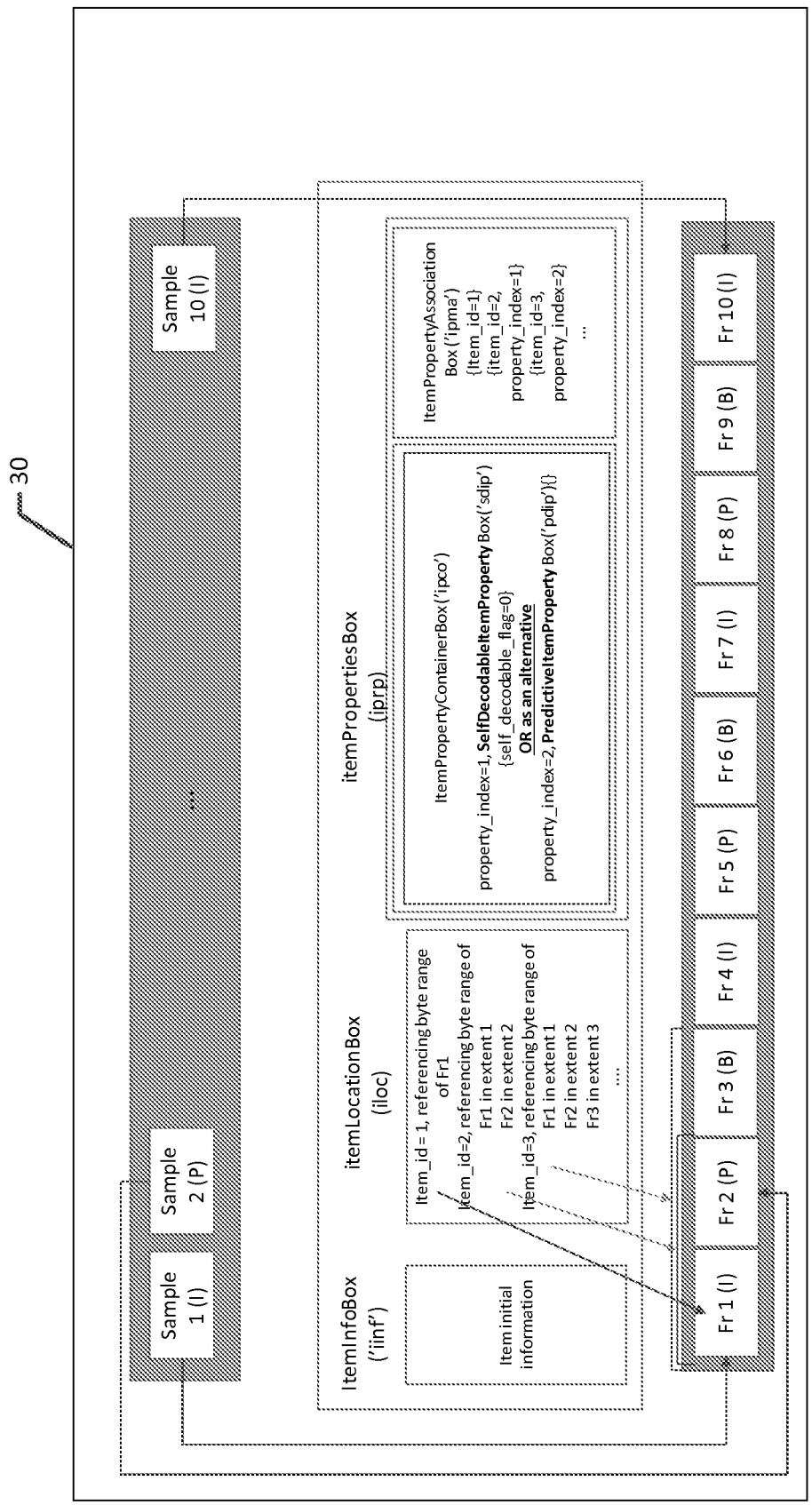
Figure 6:
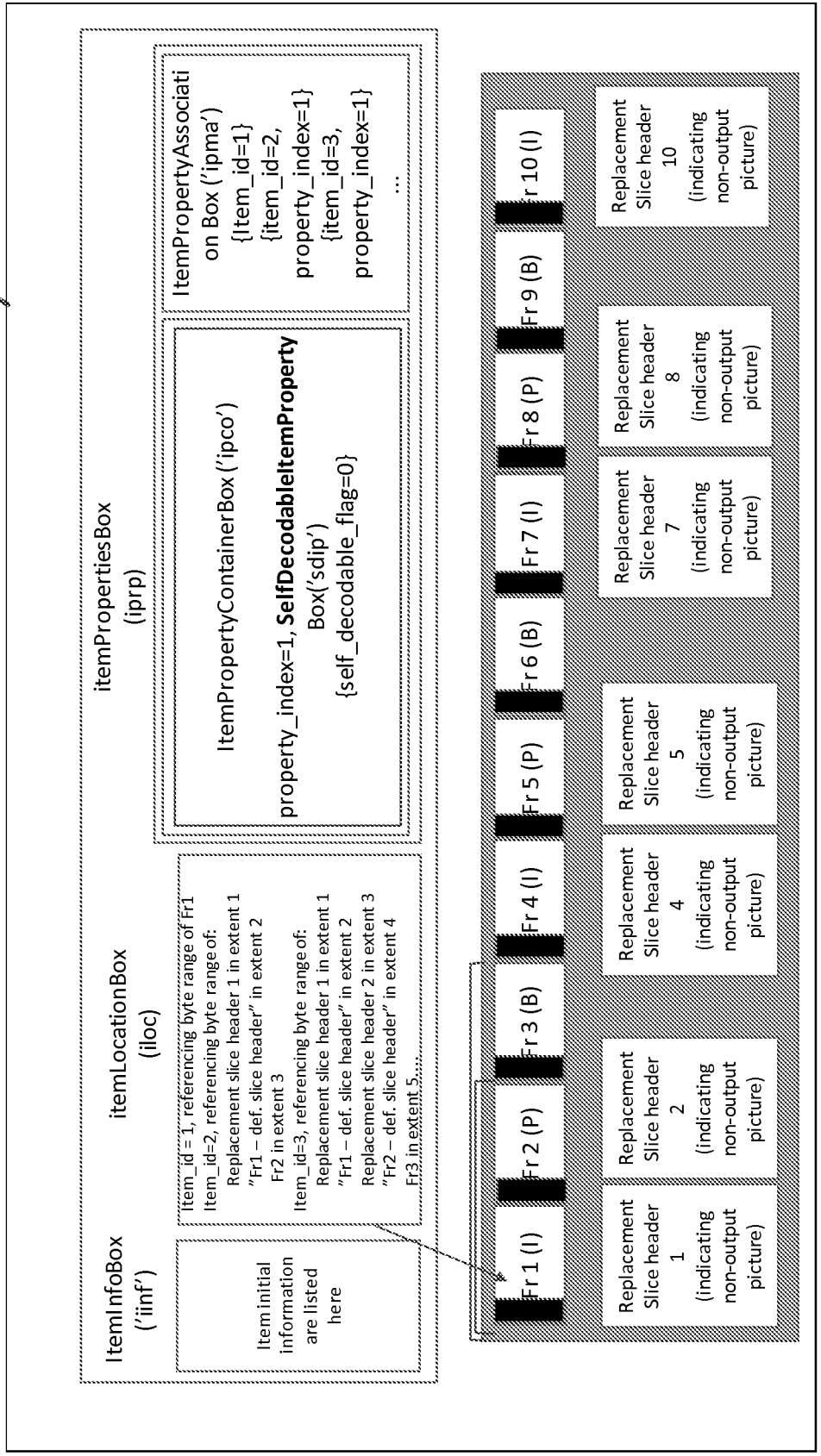
Figure 7:
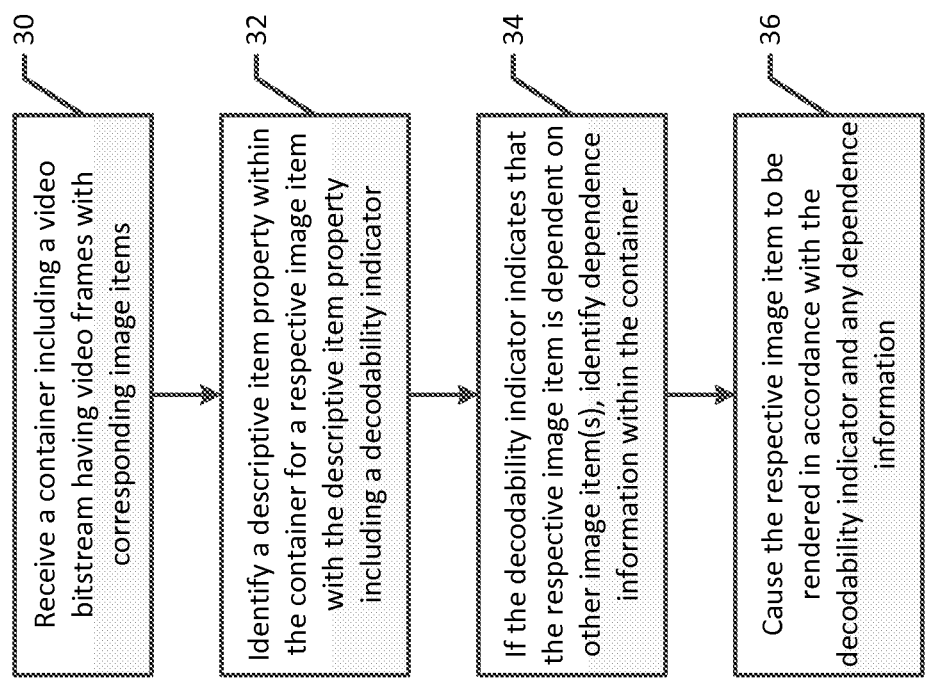

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment to the present disclosure;

FIG. 2 is a flow chart illustrating the operations performed, such as by the apparatus of FIG. 1, in order to construct a container including a decodability indicator and, in some instances, dependence information in accordance with an example embodiment of the present disclosure;

FIG. 3 illustrates an image container file including a video bitsteam, a track including a plurality of video samples and decodability indicators in the form of a SelfDecodableItemProperty box and a ReferenceItemsProperty box in accordance with an example embodiment of the present disclosure;

FIG. 4 illustrates an image container file including a video bitsteam, a track including a plurality of video samples and a mapping of the video samples/image items to respective video frames of the video bitstream in accordance with an example embodiment of the present disclosure;

FIG. 5 illustrates an image container file including a video bitsteam, a track including a plurality of video samples and dependence information including an indication of the concatenation of video frames in accordance with an example embodiment of the present disclosure;

FIG. 6 illustrates an image container file including a video bitsteam and slice headers (or replacement slice headers) associated with respective video frames in order to provide an indication as to whether a video frame is an output picture or a non-output picture in accordance with an example embodiment of the present disclosure; and FIG. 7 is a flow chart illustrating the operations performed, such as by the apparatus of FIG. 1, in order to process a container and to cause a respective image item to be rendered in accordance with a decodability indicator and any dependence information included within the container in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to one or more or all of the following: (a) hardware-only circuit implementations (such as implementations in analog circuitry and/or digital circuitry); (b) combinations of circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g., firmware) for operation, but the software may not be present when needed for operation. This definition of 'circuitry' applies to all uses of this term in this application, including in any claims. As a further example, as used in this application, the term 'circuitry' also covers an implementation of merely a hardware circuit or processor (or multiple processors) or portions of a hardware circuit or processor and its (or their) accompanying software and/or firmware. The term 'circuitry' also covers, for example and if applicable to the particular claim element, a baseband integrated circuit or processor integrated circuit for a mobile phone or a similar integrated circuit in a server, a cellular network device or other computing or network device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided, such as in the form of a video encoder, in accordance with an example embodiment in order to construct a container including a video bitstream that provides information regarding whether individual image items corresponding to the video frames of the video bitstream are self-decodable or are dependent upon one or other image items and, in an instance in which a respective image item is dependent upon one or more other image items, to also provide dependence information identifying the one or more image items. After storage or transmission of the resulting container, the container may be processed, such as by a video decoder, in order to identify whether respective image items are self-decodable or are dependent upon one or more other image items and, in an instance, in which a respective image item is dependent upon one or more other image items to identify dependence information identifying the one or more other image items. As such, the respective image item may be rendered in an efficient manner based upon the information regarding whether or not a respective image item is self-decodable and, in an instance in which the respective image item is not self-decodable, based upon the dependence information. Consequently, the method, apparatus and computer program product of an example embodiment facilitate the coding and decoding of a video bitstream and permit the image items corresponding to video frames of the video bitstream that are dependent upon other image items, such as P or B frames, to be efficiently rendered without re-encoding a video frame or increasing the file size to any significant degree.

The method, apparatus and computer program product may be utilized in conjunction with a variety of different image files including image files formatted in accordance with a number of different formats including various container file formats. By way of example, but not of limitation, however, the method, apparatus and computer program product will be described below in conjunction with image files formatted in accordance with the ISOBMFF and, more particularly, in conjunction with the HEIF that is built on top of the ISOBMFF for the storage of images and image sequences. HEIF has a rich set of features and, as a result, is feature-wise superior to at least some other image file formats.

With respect to ISOBMFF, an image container file is provided that includes one or more building blocks called box(es). Each box may have a header and a payload. The box header indicates the type of the box and the size of the box, typically in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISOBMFF may be considered to specify a hierarchical structure of boxes. Each box of the ISO base media file may be identified by a four-character code (4CC, fourCC). A four-character code may interchangeably be represented by a 32-bit unsigned integer (by assuming a certain conversion of characters to 8-bit values, a certain bit endianness, and a certain byte endianness). The header may provide information about the type and size of the box.

According to the ISOBMFF, a file may include media data and metadata that may be enclosed in separate boxes. In an example embodiment, the media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track (trak) box. Each track is associated with a handler, identified by a four-character code, specifying the track type. Video, audio, and image sequence tracks can be collectively called media tracks, and they contain an elementary media stream. Other track types comprise hint tracks and timed metadata tracks. Tracks comprise samples, such as audio or video frames. A media track refers to samples (which may also be referred to as media samples) formatted according to a media compression format (and its encapsulation to the ISOBMFF). A hint track refers to hint samples, containing cookbook instructions for constructing packets for transmission over an indicated communication protocol. The cookbook instructions may include guidance for packet header construction and may include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, one media track may be selected.

The 'trak' box contains a Sample Table box. The Sample Table box may include, for example, all the time and data indexing of the media samples in a track. Typically, the Sample Table box is required to contain a Sample Description box. The Sample Description box typically also includes an entry count field, specifying the number of sample entries included in the box. In most implementations, the Sample Description box is required to contain at least one sample entry. The sample entry format depends on the handler type for the track. Sample entries give detailed information about the coding type used and any initialization information needed for that coding.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above may be realized.

In some examples, the media samples for the movie fragments may reside in an mdat box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISOBMFF specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

Regardless of the file format of the image file, the apparatus of an example embodiment may be provided by any of a wide variety of computing devices including, for example, an image processor, a video encoder, a video decoder, a mobile terminal, such as a smartphone, a tablet computer, a personal computer, a computer workstation or any other device configured to process an image file. Regardless of the computing device that embodies the apparatus, the apparatus 10 of an example embodiment includes, is associated with or is otherwise in communication with processing circuitry 12, a memory 14, a communication interface 16 and optionally, a user interface 18 as shown in FIG. 1.

The processing circuitry 12 may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including an image container file, one or more image items, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 10 is configured to process the image container file and render the one or more image items included within the image container file, the apparatus 10 may optionally include a user interface 18 that may, in turn, be in communication with the processing circuitry 12 to provide output to the user, such as by rendering the image item(s) in the image container file and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circutiry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 14, and/or the like).

Referring now to FIG. 2, the operations performed, such as by the apparatus 10 of FIG. 1, in order to construct a container, such as an image container file or other ISOBMFF compliant container, that includes a video bitstream and information regarding the decodability of frames of the video bitstream in accordance with an example embodiment are depicted. As shown in block 20, the apparatus includes means, such as a processing circuitry 12, the communication interface 16 or the like, for receiving a video bitstream. The video bitstream may be received from an image capture device, such as a camera, a video recorder, an image sensor or the life. Alternatively, the video bitstream may have been captured and then stored such that the video bitstream is received from a database or other memory device with which the apparatus is in communication. Still, further, the video bitstream may be received via the communication interface following transmission from another device or entity. The video bitstream includes a plurality of sequential video frames that comprise a video track. As described below, in some embodiments, there is a separate image item for each video frame of a video track. Image items include information about item properties and item data location information. However, the video frame information is generally not duplicated and a corresponding image item may simply reference the same byte range in the media data (that stores the video bitstream) as the video frame. As such, a video sample and image item are different metadata representations which point to the same video frame media bitstream data. However, not all video frames have a corresponding image item. In an embodiment in which a video frame does not have a corresponding image item, predictive image items can be represented by the extents mechanism, by referencing the media bitstream portions in different extents which are defined in the item location ('iloc') box. In another example embodiment, a combination of both ReferenceItemsProperty and extents mechanism can be used by an image item.

As shown in block 22 of FIG. 2, the apparatus 10 also includes means, such as the processing circuitry 12 or the life, for constructing a container including the video bitstream formed of the plurality of video frames. The container may be an image container file, an ISOBMFF compliant file or another type of container file. In addition to the video bitstream, the container includes the image items that correspond to the video frames of the video bitstream. The apparatus also includes means, such as the processing circuitry or the like, for defining a descriptive item property within the container for a respective image item. Descriptive item properties may be defined within the container for each of the image items, or for only some of the image items, such as the image items that are self-decodable as described below. In this regard, the descriptive item property includes a decodability indicator providing information as to whether the respective image item is self-decodable and, as such, is able to be successfully decoded without reference to other image items or, alternatively, is dependent upon one or more other image items in order to be successfully decoded. In an example embodiment, the descriptive item property may be included within a meta box within the container.

Relative to the decoding of an image item, it is noted that a video bitstream includes a plurality of video frames, each of which may have an associated image item. By way of example, a video bitstream that includes ten sequential video frames, such as a video bitstream captured by an image capture device operating in burst mode, is shown below in which each frame is denoted as "Fr" followed by a unique frame number, e.g. 1, 2, . . . , 10.

| Fr 1: I | Fr 2: P | Fr 3: B | Fr 4: I | Fr 5: P | Fr 6: B | Fr 7: I | Fr 8: P | Fr 9: B | Fr 10: I |
|---------|---------|---------|---------|---------|---------|---------|---------|---------|----------|

As shown, each frame also includes an indication as to the type of frame, such as whether the frame is coded as an intra frame so as to be self-decodable without reference to any other image item during its decoding, a predicted frame P that is dependent on one other frame within the bitstream for its successful decoding or a bi-directionally-predicted frame B that is dependent on two other frames in the video bitstream for its successful decoding.

The following table depicts the ten different video frames of this example video bitstream by frame number with an indication of the type of each video frame and, for those video frames that are dependent on one or more other frames for proper decoding, the other video frames upon which a respective video frame is dependent.

| Frame number | Frame Type | Dependent Frame 1 | Dependent Frame 2 |
|---|---|---|---|
| 1 | I | — | — |
| 2 | P | 1 | — |
| 3 | B | 2 | 4 |
| 4 | I | — | — |
| 5 | P | 4 | — |
| 6 | B | 5 | 7 |
| 7 | I | — | — |
| 8 | P | 7 | — |
| 9 | B | 8 | 10 |
| 10 | I | — | — |

Based on the foregoing decoding dependency, an encoder generates this example video bitstream in the following decoding order (with reference made to the respective frame numbers):

1　4　2　3　5　7　6　8　10　9

This video bitstream is, in turn, received by the apparatus and is stored in the container, such as in a media data (mdat) box as defined, for example, by the ISOBMFF format in conjunction with an image container file, and as described above in conjunction with block 20 of FIG. 2. Although the video bitstream may be formatted in a variety of different manners, in an embodiment in which the video bitstream is stored in a container of an HEIF file as a video track, each video frame of the video bitstream may have an associated image item with the associated image item uniquely identified within the container by a corresponding image identifier (ID), such as depicted in the following table:

| Frame number | Frame Type | Corresponding image Item ID |
|---|---|---|
| 1 | I | 101 |
| 2 | P | 102 |
| 3 | B | 103 |
| 4 | I | 104 |
| 5 | P | 105 |
| 6 | B | 106 |
| 7 | I | 107 |
| 8 | P | 108 |
| 9 | B | 109 |
| 10 | I | 110 |

In some embodiments, the image items of a HEIF file do not result in the creation of duplicate media data, but, instead, simply reference the media data of the corresponding video frame and store the metadata associated with the corresponding video frame.

Returning to the descriptive item property that includes a decodability indicator providing information as to whether a respective image item is self-decodable without reference to other image items during decoding or is dependent upon one or more other image items for successful decoding, the descriptive item property may be defined in a variety of different manners. By way of example, but not of limitation, however, the descriptive item property of one example embodiment may be an extension of the ItemFullProperty of an HEIF file and may be defined as follows:

```
aligned(8) class SelfDecodableItemProperty
    extends ItemFullProperty('sdip', version = 0, flags = 0) {
    unsigned int(1) self_decodable_flag; // indicates whether or not this
    item is self decodable
    unsigned int(7) reserved;
}
```

The class name SelfDecodableItemProperty and the four-character code sdip are merely examples and the descriptive item property may have other names and codes in other example embodiments. In the foregoing example, the self_decodable_flag serves as the decodability indicator. In this example embodiment, in an instance in which the self_decodable_flag is set to 1, the respective image item is self-decodable and may be successfully decoded without reference to other image items. However, in an instance in which the self_decodable_flag is set to 0, the decoding of the respective image item is dependent upon one or more other image items. With reference to the foregoing example in which a video bitstream included 10 video frames, the self_decodable_flag of the descriptive item property associated with each respective image item is shown in the following table:

| Frame number | Frame Type | Corresponding image Item ID | self_decodable_flag |
|---|---|---|---|
| 1 | I | 101 | 1 |
| 2 | P | 102 | 0 |
| 3 | B | 103 | 0 |
| 4 | I | 104 | 1 |
| 5 | P | 105 | 0 |
| 6 | B | 106 | 0 |
| 7 | I | 107 | 1 |
| 8 | P | 108 | 0 |
| 9 | B | 109 | 0 |
| 10 | I | 110 | 1 |

In addition to or instead of the SelfDecodableItem Property, the decodability indicator may be provided in different manners in other embodiments. For example, the decodability indicator may be a property or other indicator that provides information as to whether the respective image item is self-decodable or is dependent upon one or more other image items for successful decoding merely by its presence or absence. In this regard, the presence of a predefined property in conjunction with a respective image item may indicate that the image item is dependent upon one or more other image items for successful decoding (or, alternatively, the presence of a predefined property may indicate that the respective image item is self-decodable). Thus, in this example embodiment, the presence (or absence) of a property or other indicator serves as a decodability indicator that provides information as to whether the respective image item is self-decodable or is dependent upon one or more other image items for successful decoding even though the property or other indicator does not provide any further information. One example of such a property or other indicator whose presence (or absence) serves as the decodability indicator is a PredictiveItemProperty that is defined as an extension of the ItemFullProperty in order to signal that there is a decoding dependency. The PredictiveItemProperty may be defined as follows:

| | |
|---|---|
| Box Type: | 'pdip |
| Property Type: | Descriptive item property |
| Container: | ItemPropertyContainerBox |
| Mandatory (per an item): | Yes for predictively coded image items |
| Quantity (per an item): | One for predictively coded image items | and may have the following syntax:
```
aligned(8) class PredictiveItemProperty
    extends ItemFullProperty('pdip', version = 0, flags = 0) {
}
```

Thus, the presence of the PredictiveItemProperty indicates that the respective image item is dependent upon one or more other image items for successful decoding. Correspondingly, the absence of the PredictiveItemProperty indicates that the respective image item is self-decodable. Thus, the PredictiveItemProperty serves as the decodability indicator in this example embodiment.

A descriptive item property may be defined and included within the container for each corresponding image item. However, in other example embodiments, the descriptive item property is only defined and included within the container for those image items that are dependent upon one or more image items with no similar descriptive item property being defined and included within the container for image items that are self-decodable. In this example embodiment, the absence of a descriptive item property for a respective image item indicates that the respective image item is self-decodable, while the presence of the descriptive item property indicates that the respective image item is dependent upon one or more other image items.

As shown in block 26 of FIG. 2, in an instance in which the decodability indicator of the descriptive item property indicates that the respective image item is dependent upon one or more other image items for successful decoding, the apparatus 10 also includes means, such as the processing circuitry 12 or the like, for including dependence information within the container and, in one embodiment, within the meta box within the container. The dependence information identifies the one or more other image items upon which the decodability of the respective image item is dependent. The dependence information may be provided in various manners. In one example embodiment, however, the descriptive item property is defined to include the dependence information. While the dependence information may be provided within the descriptive item property in this example embodiment in various manners, the dependence information is provided, in one example embodiment, as a list of the one or more other image items upon which successful decoding of the respective image item is dependent. While the inclusion of the dependence information within the descriptive item property may be accomplished in various manners, one example of a reference item property termed the self decodable item property that includes the dependence information is as follows:

```
aligned(8) class SelfDecodableItemProperty
    extends ItemFullProperty('sdip', version = 0, flags = 0) {
    unsigned int(1) self_decodable_flag; // indicates whether or not this item is self decodable
    unsigned int(7) reserved;
    unsigned int(16) reference_count;
    for (j=0; j<reference_count; j++) {
        unsigned int(16) dependent_item_ID;
    }
}
``` wherein the reference_count identifies the number of other image items upon which the respective image item is dependent for successful decoding and the dependent_item_IDs provide the set of image IDs for the other image items upon which the respective image item is dependent for successful decoding.

Although the dependence information may identify the other image items upon which the respective image item is dependent to different levels of dependency, such as a first level of dependency that identifies the other image items upon which the respective image item is directly dependent, a second-level of dependency that identifies the other image items upon which the respective image item is directly dependent (the first level dependent image items) as well as the other image items upon which the first level dependent image items are dependent, and so on. The dependence information of an example embodiment, including that provided within the foregoing example of a descriptive item property, provides an indication of the first-level dependent image items or multiple levels, such as all levels, of dependent image items. Thus, in the foregoing example, the reference_count indicates the number of first-level dependent image items (or all levels of dependent image items) and the dependent_item_ID list identifies the image IDs for each of the first-level dependent image item (or each of the dependent image items for all levels) upon which the respective image item is dependent for successful decoding. The dependence information, such as the dependent_item_ID list may order the image identifiers of the one or more other image items upon which the successful decodability of the respective image item is dependent in the order that the other image items are referenced during decoding, that is, in decoding order. Alternatively, the dependence information may order the image IDs of the one or more other image items in accordance with any other predefined or preferred order.

As noted above, the dependence information may be provided in other manners in accordance with other example embodiments. For example, another item property box may be defined within the container for the respective image item. Thus, in this example embodiment, an item property box may be defined within the container for each of the image items or at least each of the image items for which successful decoding is dependent upon one or more other image items. In this example embodiment, the item property box includes the dependence information and the dependence information, in turn, includes a list of one or more other image items upon which successful decoding of the respective image item is dependent, such as described above in conjunction with the embodiment in which the dependence information was included within the descriptive item property. Although the item property box of this example embodiment may be defined in various manners, the item property box of one example may be an extension of the ItemFullProperty of an HEIF file, is termed a ReferenceItemsProperty and is defined as follow:

```
aligned(8) class ReferenceItemsProperty
    extends ItemFullProperty('reip', version = 0, flags = 0) {
    unsigned int(16) reference_count;
    for (i=0; i< reference_count; i++) {
        unsigned int(16) reference_item_ID[i];
    }
}
```

The name of the item property box ReferenceItemsProperty and the four-character code 'reip' are provided as examples and the item property box may have other names and may be associated with different four-character codes in other example embodiments. As described above, the item property box of this example embodiment also includes a reference count that provides an indication of the number of other image items upon which the respective image item is dependent and a reference_item_ID[i] that provides a listing of the one or more other image items, such as in decoding or other predefined order, which corresponds to the list of direct or indirect image items which are needed to decode the respective image item. The sequence of image items with item_ID equal to reference_item_ID[i] for all values of i from 0 to reference_count−1, inclusive, in increasing order of i, followed by the image item associated with this item property forms a bitstream that conforms to the decoder configuration item property of the image item.

Referring now to FIG. 3 to further illustrate this embodiment, an image container file 30 including an encoded video bitstream comprised of frame Fr 1, frame Fr 2, . . . , frame Fr 10 stored in the media data box ('mdat') and a plurality of video track samples comprised of Sample 1, Sample 2, . . . , Sample 10 corresponding to respective frames in the mdat are depicted. The video track samples store metadata associated with the corresponding video frames and are disposed within the track ('trak') box. The image container file of FIG. 3 also includes a meta box ('meta') that includes image item metadata. Although different types of image item metadata may be included, the image item metadata of FIG. 3 includes item initial information stored in the ItemInfoBox ('iinf'), information identifying the byte range of the frame of the video bitstream that corresponds to a respective image item or video sample stored in the ItemLocationBox (iloc), the decodability indicator, such as provided by the SelfDecodableItemProperty Box and/or the ReferenceItemsProperty Box within the ItemPropertyContainerBox ('ipco') of the ItemPropertiesBox ('iprp') and information associating item properties to respective image items as represented by the ItemPropertyAssociation Box ('ipma') of the ItemPropertiesBox ('iprp'). In another embodiment, a mapping of the video frames of the video bitstream to corresponding image items is provided. Although the mapping may be provided in various manners, a sample group description entry may be defined within the sample table box of the video bitsteam. The sample group description entry serves to map the video frames to corresponding image items. Although the sample group description entry may be defined in various manners, the sample group description entry of an example embodiment is defened as an extention of a SampleGroupDescriptionEntry (smde) as defined by the ISOBMFF specification, is named SampleToMetadataItemDependencyEntry as set forth below:

```
class SampleToMetadataItemDependencyEntry( )
extends SampleGroupDescriptionEntry('smde') {
    unsigned int(32) num_items;
    for(i = 0; i < num_items; i++) {
        unsigned int(32) referenced_item_ID[i];
    }
}
```

The SampleGroupDescriptionEntry of this example embodiment is utilized to identify the sample group(s) to which each video frame of the video bitstream belongs. With respect to the foregoing example of a sample group description entry, the num items field indicates the number of other image items upon which a respective image item is dependent while the referenced_item_ID[i] field of this example embodiment defines the image item identifiers that are referenced by a respective image item [i] and, as a result, defines the decoding dependencies for the respective image item. In other words, the respective image item may be successfully decoded based upon reference to the one or more other image items identified by the referenced_item_ID[i].

Referring now to FIG. 4 to illustrate this example embodiment, an image container file 30 including an encoded video bistream comprised of frame Fr 1, frame Fr 2, . . . , frame Fr 10 stored in the media data box ('mdat') and a plurality of video track samples comprised of Sample 1, Sample 2, . . . , Sample 10 corresponding to respective frames in the mdat are depicted. The video track samples store metadata associated with the corresponding video frames and are disposed within a sample table box (stbl) of a track ('trak') box. In this example embodiment, the sample table box also includes a SampleGroupDescription ('sgpd') including a SamleToMetadataItemDependencyEntry ('smde') for each sample that is used as a reference for prediction of an image item. The sample table box of this example embodiment also includes a SampleToGroupBox ('sbgp') defining the grouping type, e.g., smde, with one entry for each video sample indicating the sdme entry to which the video sample belongs. The image container file of FIG. 4 also includes a meta box ('meta') that includes image item metadata. Although different types of image item metadata may be included, the image item metadata of FIG. 4 includes item initial information stored in the ItemInfoBox ('iinf'), information identifying the byte range of the frame of the video bitstream that corresponds to a respective image item or video sample stored in the ItemLocationBox (iloc), the decodability indicator, such as provided by the SelfDecodableItemProperty Box within the ItemPropertyContainerBox ('ipco') of the ItemPropertiesBox ('iprp') and information associating item properties to respective image items as represented by the ItemPropertyAssociation Box ('ipma') of the ItemPropertiesBox ('iprp').

In an embodiment in which a sample group description entry, such as the foregoing SampleToMetadataItemDependencyEntry, is utilized to indicate the other image items upon which a respective image item is dependent, a decoder, such as a parser of the decoder, may process all of the sample groupings in order to generate the decoding dependency information for a respective image item since this information is distributed to the various video frames of the video track.

In another example embodiment, the dependence information includes the concatenation of the video frames of the respective image item and the one or more image items upon which successful decoding of the respective image item is dependent. Although the image items may be concatenation in various manners, one example is to utilize the item offset construction technique as defined by the item location box (iloc) of the ISOBMFF specification in order to concatenation multiple image items together so as to generate a decodable video bitstream. In this example embodiment, the media data of a second video frame (Frame 2) that is dependent upon a first video frame (Frame 1) may be formed of two extents, namely, extent 1 covering the media data of the first frame and extent 2 covering the media data of the second frame. In accordance with this example embodiment and in furtherance of this example involving Frames 1 and 2, the two extents may be concatenated, such as via the rules defined by the item location box, as follows:
 extent 1: covering the media data of Frame 1
 extent 2: covering the media data of Frame 2

As such, the resulting video bitstream is decodable and the final decoded frame will provide the desired decoding image data of the second frame as the decoder will first decode the media data of Frame 1 upon which the successful decoding of Frame 2 is dependent prior to decoding the media data of Frame 2.

Referring now to FIG. 5 to further illustrate this embodiment, an image container file 30 including an encoded video bistream comprised of frame Fr 1, frame Fr 2, . . . , frame Fr 10 stored in the media data box ('mdat') and a plurality of video track samples comprised of Sample 1, Sample 2, . . . , Sample 10 corresponding to respective frames in the mdat are depicted. The video track samples store metadata associated with the corresponding video frames and are disposed within the track ('trak') box. The image container file of FIG. 5 also includes a meta box ('meta') that includes image item metadata. Although different types of image item metadata may be included, the image item metadata of FIG. 5 includes item initial information stored in the ItemInfoBox ('iinf'), information identifying the byte range of the frame of the video bitstream that corresponds to a respective image item or video sample stored in the ItemLocationBox (iloc), the decodability indicator, such as provided by the SelfDecodableItemProperty Box and/or the PredictiveItemProperty Box within the ItemPropertyContainerBox ('ipco') of the ItemPropertiesBox ('iprp') and information associating item properties to respective image items as represented by the ItemPropertyAssociation Box ('ipma') of the ItemPropertiesBox ('iprp'). As illustrated, the ItemLocationBox of this example embodiment defines the byte range of video samples (following the video sample corresponding to the first frame) in terms of the byte ranges of extent(s) of one or more frames, such as one or more prior frames, that combine to form a respective frame. In this example embodiment the video track of video samples need not be utilized to decode images and, instead, only the encoded video bitstream need be utilized.

As the foregoing example illustrates, the media data of a respective image item includes not only the media data of the respective image item, but also the media data (or a reference to the media data as described below) of the other image items upon which the respective image item is dependent in a concatenated form. Thus, the concatenation of the respective image items as well as the other image items upon which the respective image item is dependent provide the dependence information in this example embodiment indicating the one or more image items upon which the successful decoding of the respective image item is dependent.

In an example embodiment in which the media data of the same frame, such as an initial intra frame is included in an extent of the concatenated media data for multiple image items, the media data of the same frame need not be included as an extent in the concatenated media data for multiple image items and, as a result, multiple copies of the coded image data need not be created. Instead, the media data of the same frame may be included in conjunction with concatenated media data associated with multiple image items by reference to the same media data of the same frame by the concatenated media data for multiple image items.

In the foregoing example embodiment, the decodability indicator of the descriptive item property may indicate that the successful decoding of the respective image item is dependent upon one or more other image items, but the dependence information need not be provided by the descriptive item property or by an item property. Instead, the dependence information may be provided by the concatenation of the respective image item and the other image items upon which the respective image item is dependent. In this example embodiment, the decoder will decode the multiple image items and utilize the final decoded image item as the decoded picture for further processing or rendering.

Instead of requiring the final image item to serve as the output, another example embodiment may mark the image items that are concatenated in the video bitstream in accordance to whether respective image item is to be output or not, regardless of whether the image item that is marked as an output picture is or is not the final image item in the concatenated series of image items. For example, a respective image item may be marked as an output picture and other image items upon which the successful decoding of the respective image item is dependent may be concatenated therewith and may be marked as non-output pictures. In this example embodiment, a decoder will output only one frame, that is, a decoded representation of the image item that is marked to be output.

The image items may be marked in various manners so as to be either an output or a non-output picture. For example, a slice header may include a syntax element that is utilized to mark the respective image item as an output picture or a non-output picture. In this regard, the pic output flag in a slice header formatted in accordance with HEVC may be utilized to indicate whether the respective image item is to be output or is not to be output. In order to avoid multiple copies of the same image item, such as the initial intra frame, being included in the set of concatenated image items associated with a plurality of respective image items merely to set the marking of the frame as an output picture or a non-output picture differently in conjunction with different image items, the concatenation of image items may, in an example embodiment, reference the same copy of sliced data for every extent that calls for the same sliced data as explained in conjunction with the following example:

extent 1: a slice header of frame 1, with picture marked as a non-output picture extent 2: the slice data of frame 1 . . . (similar pairs of extents until a the last frame N)

extent M: a slice header of frame N, with picture marked as an output picture extent M+1: the slice data of frame N In this example embodiment, an image item that includes only frame 1 includes only extents 1 and 2 from the foregoing example. In order to avoid the inefficiencies associated with the duplication of the media data, extent 2 will not duplicate the slide data of frame 1, but will refer to the same byte range as extent 2 in the foregoing example, thereby conserving memory as well as processing resources associated with the storage and transmission of the concatenated image items.

Referring now to FIG. 6 to further illustrate this embodiment, an image container file 30 including an encoded video bistream comprised of frame Fr 1, frame Fr 2, . . . , frame Fr 10 stored in the media data box ('mdat'), but unlike other embodiments, a video track including a plurality of video samples need not be included. In this example, embodiment the video frames may include a default slide header indicating that the video frame is an ouptu picture. For those video frame that are not output pictures, however, the mdat of this example embodiment also includes an additional bitstream including a replacement slice header for one or more of the video frames, namely, the video frames that are designated to be a non-output picture, to indicate that the video frames are non-output pictures. The image container file of FIG. 6 also includes a meta box ('meta') that includes image item metadata.

Although different types of image item metadata may be included, the image item metadata of FIG. 6 includes item initial information stored in the ItemInfoBox ('iinf'), information identifying the byte range of the frame of the video bitstream that corresponds to a respective image item or video sample stored in the ItemLocationBox (iloc), the decodability indicator, such as provided by the SelfDecodableItemProperty Box within the ItemPropertyContainerBox ('ipco') of the ItemPropertiesBox ('iprp') and information associating item properties to respective image items as represented by the ItemPropertyAssociation Box ('ipma') of the ItemPropertiesBox ('iprp'). As illustrated, the ItemLocationBox of this example embodiment defines the byte range of video samples (following the video sample corresponding to the first frame) in terms of the byte ranges of the slice headers or replacement slice headers of one or more frames, such as one or more prior frames, that are referenced in combination with and/or that are combined to form a respective frame. In this example embodiment the video track of video samples need not be utilized to decode images and, instead, only the encoded video bitstream and associated slice headers need be utilized.

Referring now to FIG. 7, the operations performed, such as by the apparatus 10 of FIG. 1 in conjunction with the processing and rendering of the video bit stream within a container are illustrated. In this regard in the shown in block 30 of FIG. 7, the apparatus includes means, such as the processing circuitry 12, communication interface 18 or the like, for receiving a container including the video bitstream having video frames with corresponding video image items. The container may be received from a database or other memory device with which the apparatus is in communication or from another device that transmits the image container file to the apparatus via the communications interface.

As shown in block 32 of this example embodiment, the apparatus 10 also includes means, such as the processing circuitry 12 or the like, for identifying a descriptive item property within the container for a respective image item. The descriptive item property includes the decodability indicator providing information as to whether the respective image item itself is self-decodable without reference to other image items or is dependent on one or more other image items for successful decoding. In an instance in which the decodability indicator of the descriptive item property indicates that the respective image item is dependent on one or more other image items, the apparatus of this example embodiment further includes means, such as the processing circuitry or the like, for identifying dependence information within the container that identifies the one or more image items upon which successful decoding of the respective image item is dependent. See block 34 of FIG. 7.

As described above, the decodability indicator and the dependence information may be provided in various manners and, as such, may be correspondingly identified in various manners. For example, the apparatus 10, such as the processing circuitry 12, of an example embodiment is configured to identify the dependence information by identifying the dependence information within the descriptive item property for the respective image item. In this example embodiment, the dependence information may include a list of one or more other image items upon which successful decoding of the respective image item is dependent. This list of the one or more other image items may be ordered in a predefined manner, such as in the decoding order in which the image items must be decoded in order to properly decode the respective image item.

In an alternative embodiment, the apparatus 10, such as the processing circuitry 12, is configured to identify the dependence information by identifying an item property box within the container for the respective image item. In this example embodiment, the item property box includes the dependence information. The dependence information of this example embodiment may also include a list of one or more other image items upon which successful decoding of the respective image item is dependent. As before, the one or more image items may be ordered in a predefined manner, such as in decoding order. In a further example embodiment, the apparatus such as the processing circuitry, is configured to identify the dependence information by identifying the concatenation of the respective image item and the one or more other image items upon which successful decoding other respective image item is dependent.

As shown in block 36 of FIG. 7, the apparatus 10 of an example embodiment also includes means, such as the processing circuitry 12, the user interface 18 or the like, for causing the respective image item to be rendered in accordance with the decodability indicator and any dependence information. By being rendered in accordance with the decodability indicator and any dependence information, the respective image item is rendered without reference to any other image item in an instance in which the decodability indicator indicates that respective image item is self-decodable. However, if the decodability indicator indicates that the respective item is dependent upon one or more other image items for successful decoding, the rendering of the respective image item is preceded by the decoding of the other image items upon which the respective image item is dependent such that the subsequent decoding of the respective image item takes into account the dependencies upon the other image items.

As such, the method, apparatus 10 and computer program product of an example embodiment provides for successful decoding of image items corresponding to the video frames of a video bit stream stored within a container, such as an image container file, including the successful decoding of image items that are predictively coded, such as P or B frames. Additionally, the method, apparatus and computer program product provide for such robust decoding in an efficient manner without excessively increasing the file size of the container or otherwise requiring extensive processing, such as for transcoding or other similar operations. Additionally, the method, apparatus and computer program product facilitate the selection of a predictively coded image item as a primary image item as a result of the inclusion of information regarding whether a respective image item is self-decodable or is dependent upon one or more other image items and, in an instance in which the respective image item is dependent upon one or more other image items, the additional inclusion of dependence information that identifies the one or more other image items upon which the respective image item is dependent.

As described above, FIGS. 2 and 7 are flowcharts of an apparatus 10, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 2 and 7. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
constructing an international organization for standardization base media file format and high efficiency image file format compliant media container file which contains one or more decoding-wise dependent image items;
constructing a descriptive item property within the media container file, wherein the descriptive item property is associated with a respective image item, wherein the descriptive item property comprises a decodability indicator constructed within metadata of the media container file, the decodability indicator providing information as to whether the respective image item is self-decodable without reference to other image items or decodability is dependent upon one or more other image items; and
in an instance in which the decodability indicator of the descriptive item property indicates that the respective image item is dependent upon one or more other image items for decoding, including dependence information within the media container file that identifies the one or more other image items upon which the decodability of the respective image item is dependent;
wherein the decodability indicator providing information as to whether the respective image item is self-decodable without reference to other image items or decodability is dependent upon one or more other image items is configured to be identified with a file parser;
wherein the dependence information that identifies the one or more other image items upon which the decodability of the respective image item is dependent is configured to be identified with the file parser.

2. A method of claim 1, wherein including the dependence information is intended to be resolved by concatenating video frames of the respective image item and the one or more other image items upon which decoding of the respective image item is dependent.

3. An apparatus comprising:
at least one processor; and
at least one memory storing instructions that, when executed by the at least one processor, cause the apparatus at least to:
construct an international organization for standardization base media file format and high efficiency image file format compliant media container file which contains one or more decoding-wise dependent image items;
construct a descriptive item property within the media container file, wherein the descriptive item property is associated with a respective image item, wherein the descriptive item property comprises a decodability indicator constructed within metadata of the media container file, the decodability indicator providing information as to whether the respective image item is self-decodable without reference to other image items or decodability is dependent upon one or more other image items; and in an instance in which the decodability indicator of the descriptive item property indicates that the respective image item is dependent upon one or more other image items for decoding, include dependence information within the media container file that identifies the one or more other image items upon which decodability of the respective image item is dependent;

wherein the decodability indicator providing information as to whether the respective image item is self-decodable without reference to other image items or decodability is dependent upon one or more other image items is configured to be identified with a file parser;

wherein the dependence information that identifies the one or more other image items upon which the decodability of the respective image item is dependent is configured to be identified with the file parser.

4. An apparatus of claim 3, wherein to include the dependence information the apparatus is further caused to: include the dependence information within the descriptive item property for the respective image item, wherein the dependence information comprises a list of the one or more other image items upon which decoding of the respective image item is dependent.

5. An apparatus of claim 3, wherein to include the dependence information the apparatus is further caused to: define an item property box within the media container file for the respective image item, wherein the item property box comprises the dependence information, and wherein the dependence information comprises a list of one or more other image items upon which decoding of the respective image item is dependent.

6. An apparatus of claim 3, wherein the dependence information is intended to be resolved by concatenating video frames of the respective image item and the one or more other image items upon which decoding of the respective image item is dependent.

7. A method comprising:
receiving an international organization for standardization base media file format and high efficiency image file format compliant media container file which contains one or more decoding-wise dependent image items;

identifying a descriptive item property associated with a respective image item, wherein the descriptive item property comprises a decodability indicator constructed within metadata of the media container file, the decodability indicator providing information as to whether the respective image item is self-decodable without reference to other image items or is dependent upon one or more other image items for decoding;

in an instance in which the decodability indicator of the descriptive item property indicates that the respective image item is dependent upon one or more other image items, identifying dependence information within the media container file that identifies the one or more other image items upon which decodability of the respective image item is dependent;

wherein the decodability indicator providing information as to whether the respective image item is self-decodable without reference to other image items or decodability is dependent upon one or more other image items is configured to be identified with a file parser;

wherein the dependence information that identifies the one or more other image items upon which the decodability of the respective image item is dependent is configured to be identified with the file parser; and rendering the respective image item based on the decodability indicator and the dependence information.

8. A method of claim 7, wherein to identify the dependence information, the method further comprises: identifying the dependence information within the descriptive item property for the respective image item, wherein the dependence information comprises a list of one or more other image items upon which decoding of the respective image item is dependent.

9. A method of claim 7, wherein to identifying the dependence information the method further comprises identifying an item property box within the media container file for the respective image item, wherein the item property box comprises the dependence information, and wherein the dependence information comprises a list of one or more other image items upon which decoding of the respective image item is dependent.

10. A method of claim 7, wherein in response to identifying the dependence information the method further comprises concatenating video frames corresponding to the respective image item and the one or more other image items upon which decoding of the respective image item is dependent.

11. An apparatus comprising:
at least one processor; and
at least one memory storing instructions that, when executed by the at least one processor, cause the apparatus at least to:

receive an international organization for standardization base media file format and high efficiency image file format compliant media container file which contains one or more decoding-wise dependent image items;

identify a descriptive item property associated with a respective image item, wherein the descriptive item property comprises a decodability indicator constructed within metadata of the media container file, the decodability indicator providing information as to whether the respective image item is self-decodable without reference to other image items or decodability is dependent upon one or more other image items;

identify dependence information within the media container file that identifies the one or more other image items upon which decodability of the respective image item is dependent, in an instance in which the decodability indicator of the descriptive item property indicates that the respective image item is dependent upon one or more other image items;

wherein the decodability indicator providing information as to whether the respective image item is self-decodable without reference to other image items or decodability is dependent upon one or more other image items is configured to be identified with a file parser;

wherein the dependence information that identifies the one or more other image items upon which the decodability of the respective image item is dependent is configured to be identified with the file parser; and render the respective image item based on the decodability indicator and any dependence information.

12. An apparatus of claim 11, wherein to identify the dependence information, the apparatus is further caused to: identify the dependence information within the descriptive item property for the respective image item, wherein the dependence information comprises a list of one or more other image items upon which decoding of the respective image item is dependent.

13. An apparatus of claim 11, wherein to identify the dependence information the apparatus is further caused to: identify an item property box within the media container file for the respective image item, wherein the item property box comprises the dependence information, and wherein the dependence information comprises a list of one or more other image items upon which decoding of the respective image item is dependent.

14. An apparatus of claim 11, wherein in response to identifying the dependence information the apparatus is further caused to: concatenate video frames corresponding to the respective image item and the one or more other image items upon which decoding of the respective image item is dependent.

15. The method of claim 1, wherein the descriptive item property is constructed as an extension of the media container file.

16. The method of claim 1, wherein the dependence information that identifies the one or more other image items upon which the decodability of the respective image item is dependent is within the metadata of the media container file.

17. The method of claim 1, wherein the descriptive item property is constructed within the metadata of the media container file.

* * * * *